US007012888B2

(12) United States Patent
Schoeneberger et al.

(10) Patent No.: US 7,012,888 B2
(45) Date of Patent: Mar. 14, 2006

(54) HIGH AVAILABILITY VOIP SUBSYSTEM

(75) Inventors: Carl Schoeneberger, Dallas, TX (US); Justin Broughton, Alameda, CA (US); Michael P. Dimitroff, Sunnyvale, CA (US)

(73) Assignee: Nuasis Corporation, San Jose, CA (US)

(*) Notice: Subject to any disclaimer, the term of this patent is extended or adjusted under 35 U.S.C. 154(b) by 0 days.

(21) Appl. No.: 10/632,649

(22) Filed: Jul. 31, 2003

(65) Prior Publication Data

US 2004/0032862 A1 Feb. 19, 2004

Related U.S. Application Data

(60) Provisional application No. 60/435,974, filed on Dec. 20, 2002, provisional application No. 60/404,076, filed on Aug. 16, 2002.

(51) Int. Cl.
*G01R 31/08* (2006.01)
(52) U.S. Cl. ............ 370/217; 370/242; 370/352; 370/401
(58) Field of Classification Search ........ 370/352–356, 370/401, 216–225, 241–245
See application file for complete search history.

(56) References Cited

U.S. PATENT DOCUMENTS

| 5,282,243 | A | 1/1994 | Dabbaghi et al. ........... 379/201 |
| 5,390,295 | A | 2/1995 | Bates et al. ................. 395/157 |
| 5,491,795 | A | 2/1996 | Beaudet et al. ............. 395/159 |
| 5,613,068 | A | 3/1997 | Gregg et al. ........... 395/200.13 |
| 5,848,143 | A | 12/1998 | Andrews et al. ............ 379/219 |
| 5,903,642 | A | 5/1999 | Schwartz et al. ........... 379/309 |
| 6,046,741 | A | 4/2000 | Hochmuth .................. 345/348 |
| 6,046,762 | A | 4/2000 | Sonesh et al. ................ 348/16 |
| 6,049,603 | A | 4/2000 | Schwartz et al. ........... 379/309 |
| 6,094,479 | A | 7/2000 | Lindeberg et al. .......... 379/220 |

(Continued)

FOREIGN PATENT DOCUMENTS

EP         1 016 998 A2    5/2000

(Continued)

OTHER PUBLICATIONS

"Declaration of Michael P. Dimitroff", 3 pages.

(Continued)

*Primary Examiner*—Ricky Ngo
*Assistant Examiner*—Nittaya Juntima
(74) *Attorney, Agent, or Firm*—Haverstock & Owens LLP

(57) ABSTRACT

A high availability VoIP system interfacing with a PSTN or other TDM network to provide higher availability and better failure recovery wherein the high availability VoIP system includes a plurality of gateways coupled to at least one hub and a proxy table and a call restoration table configured in each of the plurality gateways. Further, the present invention is a method of providing a high availability VoIP system wherein the method includes configuring a plurality of gateways between a PSTN and at least one hub of the system, implementing a proxy table and a call restoration table in each of the plurality of gateways, wherein when a call is received by a gateway in the plurality of gateways from the PSTN, the call is divided into a session initiation protocol (SIP) portion and a real time protocol (RTP) portion, and further wherein the SIP portion is sent to a proxy server and the RTP portion is sent to a media server, both being located in the at least one hub and further routed to an endpoint such as a SIP controlled softphone. A further method of the present invention includes routing SIP voice calls through the plurality of gateways using a proxy server priority table.

74 Claims, 4 Drawing Sheets

U.S. PATENT DOCUMENTS

| | | | |
|---|---|---|---|
| 6,122,364 A | 9/2000 | Petrunka et al. | 379/265 |
| 6,144,667 A * | 11/2000 | Doshi et al. | 370/401 |
| 6,188,673 B1 | 2/2001 | Bauer et al. | 370/252 |
| 6,188,761 B1 | 2/2001 | Dickerman et al. | 379/265 |
| 6,201,804 B1 | 3/2001 | Kikinis | 370/352 |
| 6,212,565 B1 | 4/2001 | Gupta | 709/229 |
| 6,219,648 B1 | 4/2001 | Jones et al. | 705/8 |
| 6,225,998 B1 | 5/2001 | Okita et al. | 345/356 |
| 6,266,058 B1 | 7/2001 | Meyer | 345/339 |
| 6,289,001 B1 * | 9/2001 | Smyk | 370/216 |
| 6,301,480 B1 | 10/2001 | Kennedy, III et al. | 455/445 |
| 6,377,568 B1 | 4/2002 | Kelly | 370/352 |
| 6,434,143 B1 | 8/2002 | Donovan | 370/356 |
| 6,445,695 B1 * | 9/2002 | Christie, IV | 370/352 |
| 6,463,148 B1 | 10/2002 | Brady | 379/265.01 |
| 6,493,695 B1 | 12/2002 | Pickering et al. | 706/47 |
| 6,529,499 B1 * | 3/2003 | Doshi et al. | 370/352 |
| 6,542,475 B1 | 4/2003 | Bala et al. | 370/271 |
| 6,574,218 B1 | 6/2003 | Cooklev | 370/352 |
| 6,584,191 B1 | 6/2003 | McPartlan et al. | 379/265.02 |
| 6,590,596 B1 | 7/2003 | Rector | 345/810 |
| 6,600,735 B1 * | 7/2003 | Iwama et al. | 370/352 |
| 6,615,235 B1 * | 9/2003 | Copeland et al. | 709/203 |
| 6,639,982 B1 | 10/2003 | Stuart et al. | 379/266.03 |
| 6,665,395 B1 | 12/2003 | Busey et al. | 379/265.09 |
| 6,674,713 B1 * | 1/2004 | Berg et al. | 370/217 |
| 6,678,265 B1 | 1/2004 | Kung et al. | 370/352 |
| 6,687,251 B1 * | 2/2004 | Mousseau et al. | 370/401 |
| 6,697,858 B1 | 2/2004 | Ezerzer et al. | 709/224 |
| 6,704,412 B1 | 3/2004 | Harris et al. | 379/269 |
| 6,766,377 B1 * | 7/2004 | Grabelsky et al. | 709/238 |
| 6,781,959 B1 * | 8/2004 | Garakani et al. | 370/242 |
| 6,850,599 B1 * | 2/2005 | Yoshitani | 379/37 |
| 6,868,059 B1 * | 3/2005 | Jones et al. | 370/216 |
| 2003/0018702 A1 | 1/2003 | Broughton et al. | 709/202 |
| 2003/0133558 A1 | 7/2003 | Kung et al. | 379/215.01 |
| 2003/0195753 A1 | 10/2003 | Homuth | 705/1 |
| 2004/0054743 A1 | 3/2004 | McPartlan et al. | 709/206 |

FOREIGN PATENT DOCUMENTS

| | | |
|---|---|---|
| WO | WO 99/65214 | 12/1999 |

OTHER PUBLICATIONS

Dr. D. E. Brown, "The Interaction Center Platform™", Interactive Intelligence, Apr. 6, 2001, pp. 1 of 31.

M. Taylor, "Integrated Versus Unified CTI—What's the Difference?", Interactive Intelligence, http://www.inin.com/news/presscoverage/presscoverage.asp?id=14, Aug. 2, 2001, pp. 1 of 9.

CosmoCom, "CosmoCall Universe™ Technology Over view", http://www.cosmocom.com/Productinfo/techover.htm, Aug. 2, 2001, pp. 1 of 3.

"Using SNMP to Manage Your Call Center More Efficiently", 2001 Aspect Communication Corporation, 12 pp.

"*Message Classification in the Call Center*", by Stephan Busemann, Sven Schmeier, and Roman G. Arens. Published in Saarbrucken,Germany, pp. 158-165.

"*The Modemization of a Call Center*", by Karen Reaoner, University of Wyoming, Client Support Services, Information Technology, Laramie WY. 82070, pp. 270-273.

"*Redefining the Call Center: Customer Service on the Internet*", by D. Steul from San Francisco, Ca., pp. 38-42.

* cited by examiner

Proxy Server Priority Table

| Proxy Address | Time Out | Level | Pointer |
|---|---|---|---|
| 192.168.0.1 | 36 mS | 1 | N/A |
| 192.168.0.2 | 36 mS | 1 | |
| 192.168.37.1 | 370 mS | 2 | N/A |
| 192.168.25.1 | 800 mS | 3 | 0 |
| 192.168.25.2 | 800 mS | 3 | 1 |
| 192.168.25.3 | 800 mS | 3 | 0 |
| DEFAULT | | -- | -- |

Call Restoration Data Table
600

| Field Option | Value |
|---|---|
| Incoming Caller | 214-555-1212 |
| Call Purpose | Billing Inquiry |
| Derivative Purpose 1 | Dispute |
| Dispute I.D. | 5/12/01/275 |
| DNI (Called Number) | (1-800-246-1000) |

HIGH AVAILABILITY VOIP SUBSYSTEM

RELATED APPLICATIONS

This Patent Application claims priority under 35 U.S.C. §119(e) of the co-pending U.S. Provisional Patent Application, Ser. No. 60/404,076 filed Aug. 16, 2002, and entitled "YOSEMITE ARCHITECTURE SPECIFICATION". The Provisional Patent Application, Ser. No. 60/404,076, filed Aug. 16, 2002, and entitled "YOSEMITE ARCHITECTURE SPECIFICATION" is also hereby incorporated by reference in its entirety.

This Patent Application claims priority under 35 U.S.C. §119(e) of the co-pending U.S. Provisional Patent Application, Ser. No. 60/435,974, filed Dec. 20, 2002, and entitled "YOSEMITE ARCHITECTURE SPECIFICATION II". The Provisional Patent Application, Ser. No. 60/435,974, filed Dec. 20, 2002, and entitled "YOSEMITE ARCHITECTURE SPECIFICATION II" is also hereby incorporated by reference in its entirety.

The co-pending and co-owned U.S. patent application, Ser. No. 10/327,360, filed Dec. 20, 2002, and entitled "REMOTE AGENT ACCESS METHOD TO A VOIP CONTACT CENTER WHERE HIGH QOS IS NOT SUPPORTED" is also hereby incorporated by reference in its entirety.

The co-pending and co-owned U.S. patent application, Ser. No. 10/327,348, filed Dec. 20, 2002, and entitled "SCHEDULED RETURN TO QUEUE WITH PRIORITY (SRQP)" so hereby incorporated by reference in its entirety.

The co-pending, co-owned and co-filed U.S. patent application, Ser. No. 10/633,250, filed Jul. 31, 2003, and entitled "AUTOMATIC MANAGEMENT OF THE VISUAL SPACE WHILE PERFORMING A TASK" is also hereby incorporated by reference in its entirety.

The co-pending, co-owned and co-filed U.S. patent application, Ser. No. 10/633,018, filed Jul. 31, 2003, and entitled "ESCALATED HANDLING OF NON-REALTIME COMMUNICATIONS" is also hereby incorporated by reference in its entirety.

The co-pending, co-owned and co-filed U.S. patent application, Ser. No. 10/632,617, filed Jul. 31, 2003, and entitled "GRAPHICAL CONTROL FOR SIMULTANEOUSLY EDITING AN ARRAY OF VALUES THAT SUM TO A FIXED VALUE" is also hereby incorporated by reference in its entirety.

FIELD OF THE INVENTION

The present invention relates generally to the field of communication networks. More specifically, the present invention relates to the field of interfacing and routing of a voice over internet protocol (VoIP) networks and local area networks (LANs) from the public switched telephone network (PSTN) or other time division multiplex (TDM) networks with improvements to provide higher availability.

BACKGROUND OF THE INVENTION

VoIP and its associated control protocols such as Session Initiation Protocol (SIP) and H.323 is a viable mechanism for transmitting real-time voice over digital data circuits. With SIP and a proxy server, load can be shared among parallel network elements. Two common problems for VoIP calls are: a failure when there is no proxy server to handle the new inbound call; and the failure of a network, or a network element, during a call. When the latter case happens, the voice connection is broken and typically the caller hangs up after hearing nothing for a period of time.

Another point of weakness in a VoIP solution is the gateway. It is the interface to the PSTN connection, and if it fails, then all calls through the gateway will be lost. Typically the larger the gateway the better the economics of the cost per voice circuit, so the customer typically buys "larger" gateways. This expands the scale of the problem when a gateway fails.

Contact Centers typically require a very high availability of the voice media channel. In time division multiplex TDM based voice systems in common use in the call center today, various redundancy schemes prevent the failure of single parts of the hardware from affecting new calls, although they will typically cause a failure of the calls that went through the network element that failed, causing the calling contact to be disconnected. When a contact has been waiting in queue and experiences such technical difficulties it will typically lead to serious customer dissatisfaction and probable customer service issues for the Contact Center operator, such as lost sales, lost customers, and abused agents.

SUMMARY OF THE INVENTION

A high availability VoIP system interfacing with a PSTN or other TDM network to provide with higher availability and better failure recovery wherein the high availability VoIP system includes a plurality of gateways coupled to at least one hub and a proxy table and a call restoration table configured in each of the plurality gateways.

Further, the present invention is a method of providing a high availability VoIP system wherein the method includes configuring a plurality of gateways between a PSTN and at least one hub of the system, implementing a proxy table and a call restoration table in each of the plurality of gateways, wherein when a call is received by a gateway in the plurality of gateways from the PSTN, the call is divided into a session initiation protocol (SIP) portion and a real time protocol (RTP) portion, and further wherein the SIP portion is sent to a proxy server and the RTP portion is sent to a media server, both being located in the at least one hub and further routed to an endpoint such as a SIP controlled softphone. A further method of the present invention includes routing SIP voice calls through the plurality of gateways using a proxy server priority table.

A high availability voice over internet protocol system coupled to a public switched telephone network comprising a plurality of gateways configured to receive at least one voice call from the public switched telephone network, wherein the plurality of gateways are coupled to at least one hub, a proxy table configured in each of the plurality of gateways, wherein the gateway sends the at least one voice call to one of at least one proxy server and a call restoration data table configured in each of the plurality of gateways, wherein the call restoration data table is provided data to restore a lost call.

The system of the present invention also includes the at least one hub coupled to the plurality of gateways being configured to receive the at least one voice call from the plurality of gateways, and further wherein the at least one voice call is divided by the plurality of gateways into a session initiation protocol portion and a real time protocol portion, the at least one hub including the at least one proxy server configured to receive the session initiation protocol portion of the at least one voice call and the at least one hub including at least one media server configured to receive the real time protocol portion for the at least one voice call.

The at least one hub also includes a computer coupled to communicate with the at least one proxy server and the media server, at least one node coupled to each of the at least one hub with a wide area network connection, wherein the at least one node includes a single proxy server and a single media server and the at least one node coupled to each of the at least one hub with a local or wide area network connection, wherein the at least one node includes the single proxy server and the single media server.

The system also includes the plurality of gateways configured such that when one of the plurality of gateways fails, the remainder of the plurality of gateways remain operational, a load balancing switch for directing any of the at least one voice calls to the plurality of gateways, the proxy table selecting the appropriate one of the at least one proxy server based on a priority scheme and the data provided to the call restoration data table transmitted to the call restoration data table in a session initiation protocol packet, further wherein the session initiation protocol packet includes a header and a session description protocol body. The data provided to the call restoration data table is stored as one or more key value pairs, wherein the key value pairs are derived from the session description protocol body of the session initiation protocol packet.

A method of providing a high availability voice over internet protocol system comprising the steps of configuring a plurality of gateways between a public switched telephone network and at least one hub, implementing a proxy table and a call restoration data table in each of the plurality of gateways, receiving in the plurality of gateways at least one voice call from the public switched telephone network, dividing the at least one voice call into a session initiation protocol portion and a-real time protocol portion, sending the session initiation protocol portion of the at least one voice call to one of at least one proxy server, the at least one proxy server being located in the at least one hub, according to the proxy table and sending the real time protocol portion of the at least one voice call to a media server, the media server being located in the at least one hub. The method of the present invention also includes the step of restoring a lost call with data provided to the call restoration data table.

The method of the present invention wherein the at least one hub includes a computer coupled to communicate with the at least one proxy server and the media server, at least one node is coupled to each of the at least one hub with a wide area network connection, the at least one node includes a single proxy server and a single media server, the at least one node is coupled to each of the at least one hub with a local or wide area network connection, the at least one node includes the single proxy server and the single media server and the plurality of gateways are configured such that when one of the plurality of gateways fails, the remainder of the plurality of gateways remain operational.

The method of the present invention also includes the step of directing any of the at least one voice calls to the plurality of gateways with a load balancing switch, wherein the proxy table selects the appropriate one of the at least one proxy server based on a priority scheme, and further wherein the data provided to the call restoration data table is transmitted to the call restoration data table in a session initiation protocol packet and the session initiation protocol packet includes a header and a body, wherein the data provided to the call restoration data table is stored as at least one key value pair, further wherein the key value pairs are derived from the body of the session initiation protocol packet.

A high availability voice over internet protocol system coupled to a public switched telephone network comprising means for configuring a plurality of gateways between a public switched telephone network and at least one hub, means for implementing a proxy table and a call restoration data table in each of the plurality of gateways, means for receiving in the plurality of gateways at least one voice call from the public switched telephone network, means for dividing the at least one voice call into a session initiation protocol portion and a real time protocol portion, means for sending the session initiation protocol portion of the at least one voice call to one of at least one proxy server, the at least one proxy server being located in the at least one hub, according to the proxy table and means for sending the real time protocol portion of the at least one voice call to a media server, the media server being located in the at least one hub. The system of the present invention also includes means for restoring a lost call with data provided to the call restoration data table.

The system of the present invention wherein the at least one hub includes a computer coupled to communicate with the at least one proxy server and the media server, at least one node is coupled to each of the at least one hub with a wide area network connection, the at least one node includes a single proxy server and a single media server, the at least one node is coupled to each of the at least one hub with a local or wide area network connection, the at least one node includes the single proxy server and the single media server and the plurality of gateways are configured such that when one of the plurality of gateways fails, the remainder of the plurality of gateways remain operational.

The system of the present invention also includes means for directing any of the at least one voice calls to the plurality of gateways with a load balancing switch, wherein the proxy table selects the appropriate one of the at least one proxy server based on a priority scheme, and further wherein the data provided to the call restoration data table is transmitted to the to the call restoration data table in a session initiation protocol packet and the session initiation protocol packet includes a header and a session description protocol body, wherein the data provided to the call restoration data table is stored as a key value pair, further wherein the key value pair is derived from the header and the session description protocol body.

A method of routing session initiation protocol voice calls through a plurality of gateways using a proxy server priority table having a proxy address for each incoming call comprising the steps of setting a level of the proxy server priority table to an n level, contacting a designated proxy when a pointer value is assigned to the proxy address, the pointer value corresponding to the designated proxy, contacting a k proxy in the n level, attaching the proxy address through the k proxy in the n level when the k proxy in the n level responds before a first time out value, contacting a k+1 proxy in the n level if the k proxy in the n level does not respond before the first time out value and setting a level of the proxy server priority table to an n+1 level when the k+1 proxy does not exist in the n level.

The method of the present invention also includes the steps of attaching the proxy address having the pointer value to the designated proxy when the designated proxy responds before a second time out value, incrementing the pointer value to the next proxy address in the n level, incrementing the pointer value to an incremented pointer value when the designated proxy does not respond before the second time out value, wherein the incremented pointer value corresponds to an incremented designated proxy and contacting the incremented designated proxy, the incremented pointer value corresponding to the incremented designated proxy.

BRIEF DESCRIPTION OF THE DRAWINGS

FIG. 2 illustrates a priority table of the present invention.

DETAILED DESCRIPTION OF THE PREFERRED EMBODIMENT

Figure 1:
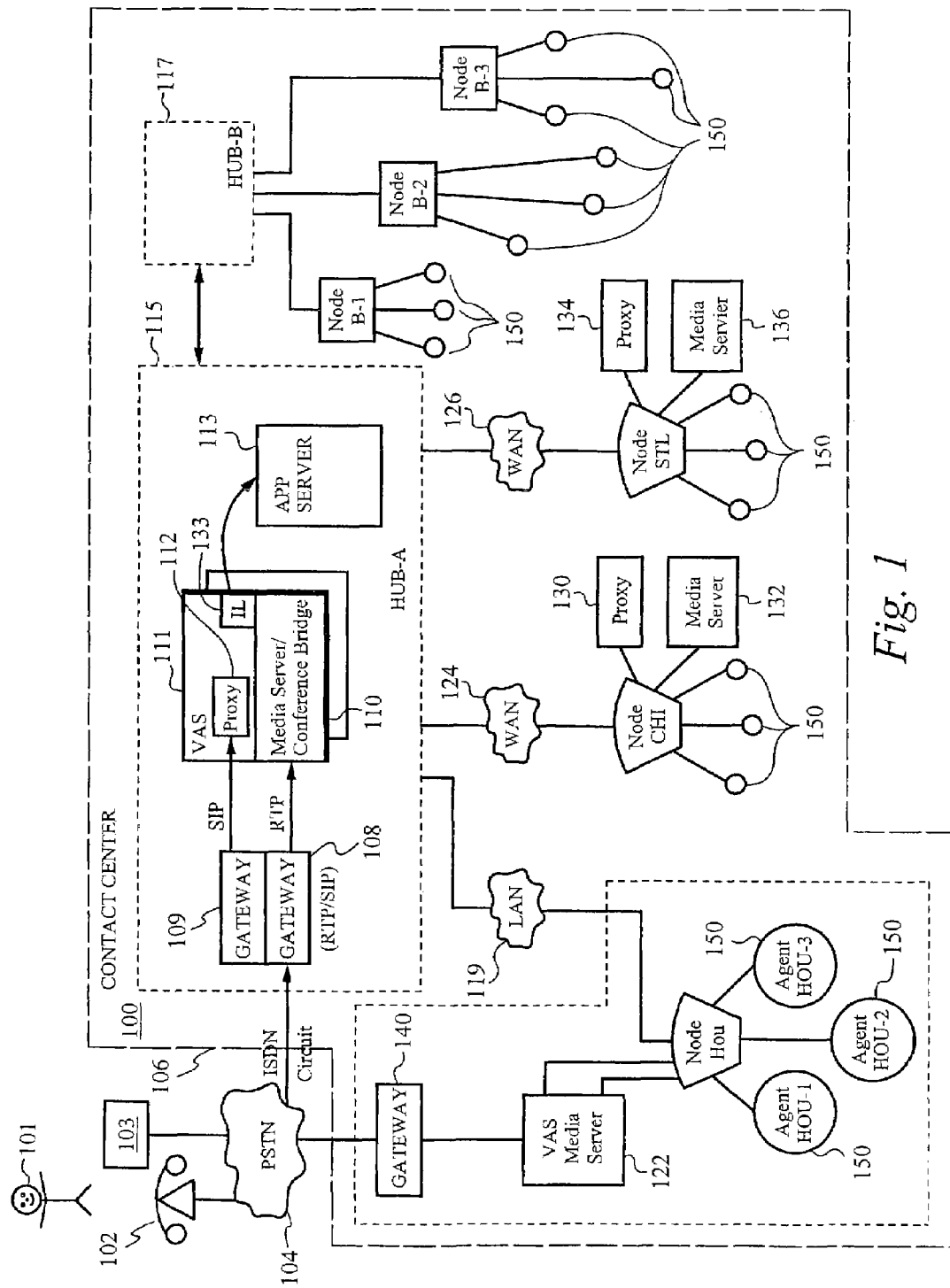
FIG. 1 illustrates a graphical representation of the preferred embodiment of the present invention as applied to interfacing between a public switched telephone network (PSTN) or time division multiplex (TDM) network and a voice over internet protocol (VoIP) local area network (LAN).

FIG. 1 depicts a graphical representation of an exemplary Contact Center 100 architecture for routing voice contacts implementing the preferred embodiment of the present invention. The details concerning this Contact Center 100 architecture are disclosed in a co-owned and co-pending U.S. patent application, Ser. No. 10/632,615, entitled CONTACT CENTER ARCHITECTURE. The U.S. patent application Ser. No. 10/632,615, entitled CONTACT CENTER ARCHITECTURE is also incorporated by reference in its entirety. Of course, it will be readily apparent to one skilled in the art that in alternative embodiments of the present invention disclosed in the following specification can and will be utilized in VoIP networks other than the Contact Center 100 incorporated by reference above.

Referring to FIG. 1, the preferred embodiment of the present invention describes a system and method to raise the effective availability of a VoIP subsystem both in call set-up and call continuation, thereby minimizing the last single point of failure to the gateway 108,109. The present invention addresses the problems listed above and overall substantially improves the availability of this solution over that of a standard VoIP solution.

FIG. 1 is an illustration of an interface between the PSTN 104 coupled to a Contact Center 100 by means of one or more gateways 108, 109. The PSTN 104 is configured such that a contact 101 dialing in on a telephone 102 on a T1 or primary rate interface (PRI) circuit, may be connected to the Contact Center 100 through the Gateway 108, 109. Alternative embodiments include any other TDM network 103 such as, but not limited to a private branch exchange (PBX) line or a tie-trunk circuit on a T1 or primary rate interface (PRI) circuit being connected to the Contact Center 100 through the Gateway 108, 109. The PSTN 104 transmits digital TDM data using one or more various protocols, including T1 protocol operating at 1.544 mHz, common to the United States, or an E1 protocol operating at approximated 2 mHz, and more common to Europe. At a T1 transmission rate of 1.544 mHz, an individual channelized T1 circuit can accommodate twenty-four separate channels at the G.711 voice encoding standard of sixty-four kilo-bits (64 kb). per second. As noted above, Europe commonly operates on the E1 protocol at a frequency of closer to 2 mHz. The E1 protocol is capable of supporting thirty two time division multiplexed channels using G.711 voice encoding for each channel. The circuit may also be an ISDN PRI circuit in one of many common formats.

A United States PRI typically has 23 B or bearer channels containing 64 kb encoded voice and one D or delta channel which contains signaling information. There are many minor variations of PRI signaling and variations within groups of digital circuits where redundant D channels may exist on two of the PRI circuits while other PRIs in the group share these D channels so they can carry 24 B channels each.

Referring now to FIG. 1, the function of the gateway 108, 109 is to convert data from the PSTN 104, typically a twenty four channel time division multiplexed T1 signal to the data format of the Contact Center 100, and to convert signaling from the Contact Center 100 network back to a data format compatible with the PSTN 104. Because of the growing popularity of internet protocol due to operating cost reductions possible through the use of VoIP, gateways 108, 109 are increasingly used to convert PSTN 104 data to a VoIP format within the communication network of a Contact Center 100. The twenty four channels of a T1 transmission are distinguishable by various digital codings separating the TDM channels. These digital codings contain channel information and some signalling information. The TDM G.711 transmission over the PSTN 104 can therefore be regarded as a TDM in 8-bit per time slot channels at 64 kb per second per channel transmission. That is, the amount of data used to distinguish channel breaks which distinguish one channel from another is minimal, and virtually all 64 kb per channel seconds are devoted to "real" data, such as voice data in a standard audio telephone call. TDM efficiently packs the voice data and signalling into a compressed and fixed format. In contrast, internet protocol is packetized and packet headers are required to separate and direct information to different "channels" or packets. IP packet headers comprise a moderate of overhead information. One reason that so little overhead data is needed in the T1 or PRI is that the twenty-four channels are addressed serially, in what could be considered a "fixed sequence" communication protocol, so that channel sixteen always follows channel fifteen. In contrast, internet protocol is not a fixed sequence format, but is based on availability of information that is in a packet ready to go with source and destination. Even among competing packets awaiting transmission from the same processing point, packet selection is limited to those packets that are queued. The system does not cycle through unused channels to examine whether they have any content. If a packet is not in a queue, no time is wasted on sending an empty channel. Accordingly, a specific "channel" (a packet defined by a packet header) is sent as often as it is queued and if the channel has capacity. Accordingly, if only four voice channels are queued, IP only needs to send packets for four channels and leaves the remainder of the data channel bandwidth available.

Still referring to FIG. 1, the call data, including the calling number, the called number and possibly the forwarding number, is decoded by the gateway 108, 109 and converted into SIP for use within the contact center. The gateway 108, 109 will divide the encoded call from the PSTN 104 into an RTP portion and a SIP portion. The RTP portion will include the voice component of the encoded call to be changed to IP packets, while the SIP portion includes the call signaling data of the encoded call.

Packet networks have "from" and "to" destinations plus other overhead. In addition to the 64 kb per second per packet for real information such as voice data, the overhead information added to VoIP packet headers in the RTP stream can increase the total information for a channel to about eighty four kilo-bits (84 kb) per second. When the T1 standard of 1.544 mHz is used within the Contact Center 100, it can be understood that, as a result of the large amount of overhead within packet headers of a VoIP network, the channel capacity of a VoIP network is typically reduced from twenty-four channels to about eighteen channels. However, it does permit sharing voice and data on the same circuit. This ability to share the same facilities can save operating costs. For example, ten agents could easily use a single wideband T1 for their voice and data needs with the voice component carried as VoIP all in the same T1. Traditional methods would have used two T1s, one for voice and the other for data.

The Contact Center 100 pictured in FIG. 1 includes several call centers which are accessible through HUB-A 115. The Contact Center 100 typically comprises a network configured for internal voice telephone routing. Most consumers are familiar with calling the "call-center" or "contact center" of various Contact Centers 100, such as service departments of software and computer companies, billing inquiries for cell phone usage, disputes and payments for credit cards, updates on claim processing of auto insurance claims, reservations with major air lines, etc. The interface and routing process begins when a customer calls the Contact Center 100 over the PSTN 104 through a telephone 102, or a customer is connected throught the PSTN 104 from a TDM network 103 such as a PBX or a tie-trunk circuit. Many enterprises are served by a "1-800" (toll free) exchange. According to the example of FIG. 1, the Contact Center 100 interfaces with the PSTN 104 through an integrated services digital network (ISDN) 106. As discussed above, the voice channel capacity or PRI for a single ISDN 106 is typically twenty three or twenty four voice channels, depending on whether one of the channels has been reserved for call data as a D channel. The call enters the Contact Center 100 through the ISDN 106 into a gateway 108. The gateway 108 converts the G.711 protocol of the PSTN 104 into packetized data for transmission over an ethernet network serving the Contact Center 100. The ethernet packetization is divided into two forms, RTP and SIP. Voice components are transmitted in RTP and the call signaling data (source and destination of the call, busy signals, etc.) are transmitted in separate Ethernet packets according to the SIP.

As stated previously, the gateway 108 divides the stream into the SIP and RTP protocols. The SIP protocol containing the identification number (ANI) of the "A" phone (calling phone), and the dialed number identification (DNI) of the called phone is directed to the voice application server (VAS) 111. The VAS 111 is preferably an identical piece of hardware in each hub and node in the contact center and also preferably includes the services of a proxy 112, a media server contact bridge (media server) 110 and interface logic 133 that interfaces the media server 110 with an application server 113. Every hub and node in the Contact Center 100 includes a VAS 111 and preferably, each VAS 111 includes the services described above. However, the VAS 111 of any hub or node can be configured with services tailored to the needs of the Contact Center 100. Also, each hub and node preferably includes an application server 113 having identical software, but not necessarily performing the same tasks.

Still referring to the preferred embodiment in FIG. 1, the proxy 112 acts as a directory that is able to share information with the services included in the VAS 111. The gateways 108, 109 associate with Hub-A must continually register with the proxy 112 in Hub-A to keep the proxy 112 current as to not only which gateways 108, 109 are functioning, but also how they are functioning. In other words, the gateways 108, 109 register with the proxy 112, as all gateways in any given hub must register with the proxy in that hub. Likewise, the local media server 110 of both the hubs and nodes are likewise registered with the proxy 112. If the services included in the VAS 111 do not continually register with the proxy 112 within pre-determined time periods as set by the Contact Center 100 administrator, the proxy 112 will assume that the resource is not available.

Various Contact Centers 100, from airlines to computer sales and support to credit card providers have different business needs and collect data relevant to the type of call being handled. These actions are stored in workflows in the application server 113. If the application server 113 in every hub is updated so as to have identical information, all hubs are, in a sense, equally equipped to handle an incoming call. However, the distribution of information depends on the policies of a given Contact Center 100. Therefore, in FIG. 1, if the application server 113 is not competent to assist in a transaction, or the HUB-A 115 is not competent to assist a client, a call originally routed to HUB-A 115 can be redirected to HUB B 117 which is also equipped with a proxy sever 112, 133, media server 110, and computer 113 in a manner similar to HUB-A 115. HUB-A 115 can also direct a caller to any of the nodes HOU, CHI, or STL, which are part of the Contact Center 100.

Within FIG. 1, each node HOU, CHI, STL and B-1 through B-3 is connected to one or more agents 150. Although the present discussion is developed largely in terms of human agents 150, it will be readily understood that the use of personal agents 150 is not required in every application. An "agent 150" is simply designated herein as an end-unit which responsively acts to satisfy the caller's 101 request. Similarly, hubs and nodes are not required, but they offer more redundant locations to host workflow processing.

The function of a node is to channel a call to the proper agent 150, and to satisfy the needs of the agent 150 during the course of the call. This can include accessing information stored in an application server 113 associated with each node or hub. Although it is possible that information required by HOU-1 is spread out among computers associated with diverse hubs, according to the preferred embodiment, the application server 113 of HUB-A 115 comprises the information necessary to provide node HOU-1 the necessary Contact Center 100 information to service callers 101 directed to its respective nodes HOU-1 HOU-2 HOU-3 The node interfacing with the select agent 150 also updates the application server 113 continually with relevant information, including both caller 101 information (e.g., a caller 101 speaking with a specific agent 150 hangs up), and data (e.g., the caller 101 provides payment information for a credit card.).

In operation, an incoming call is converted to RTP and SIP protocols by the gateway 108, 109 and directed to a hub. Each gateway 108, 109 also searches its own proxy table. The details of the operation of the proxy table will be discussed in further detail later in this description. The proxy table directs the gateway 108, 109 to send a SIP inquiry to a particular proxy 112 in a particular hub. For explanation purposes, assume that the gateway 108 has determined that the proxy 112 in HUB-A 115 is the appropriate proxy 112 to send the SIP inquiry to, based on the information found in the proxy table in the gateway 108. The gateway 108 sends the SIP to the proxy 112. The proxy 112, having a directory of registered media servers 110 will forward the SIP inquiry to the appropriate media server 110 having properly and timely registered with the proxy 112. When this SIP inquiry reaches this assigned media server 110, the media server 110, through the interface logic 133, will communicate with the application server 113, starting a workflow on that call in the application server 113.

Still referring to FIG. 1, the gateway 108, 109 will direct the RTP stream of the call to be connected to a particular media server 110. Again, for the purposes of explanation, the HUB-A 115 will be used. It should be noted that this operation as described may occur in any hub of the Contact Center 100. The application server 113 will then instruct the media server 110 in which the RTP is connected to transfer the RTP stream to the appropriate node. For illustrative purposes, the Node CHI will be utilized as an example here. Again, the Node CHI includes a VAS 111 as depicted in HUB-A 115, and preferably includes the services as well, i.e., a proxy 112, a media server 110 with interface logic 133 to an application server 113. The media server 100 of the Node CHI will instruct the gateway to disconnect the RTP stream from the media server 110 of HUB-A 115 and will direct the RTP stream to connect to the media server 110 of the Node CHI. This connection will start the application server 113 of the Node CHI, allowing the application server 113 to conference an agent 150 into the call by instructing the media server 110 of the Node CHI to connect with the agent 150. Still referring to HUB-A 115 and the Node CHI of FIG. 1, as long as the RTP stream is connected to the media server 110 of the Node CHI, any agent 150 or supervisor or administrator with proper authority will be able to conference into that call by plugging into the media server 110.

When a call is inadvertently disconnected, a re-start call is required to put the call back to a place where it was when it was disconnected. For example, if the caller had already entered their account number and opted to speak to an agent that could handle billing inquiries, the caller, on re-start, would be placed in the next step in the workflow. That is, the SIP inquiry sent to the proxy would include key value pairs identifying that the caller had already entered his account number and selected a billing inquiry agent. While the concept of key value pairs will be explained in further detail later in this discussion, it should be noted that key value pairs are worked up, added and updated in the application server 113 and are transferred through the Contact Center 100 with the call. As this process is occurring, a copy of the key value pairs is forwarded to the gateway 108, 109, the last single point of failure in the Contact Center 100.

Now going back to the routed call that the agent 150 has been conferenced into in the media server 110 of the Node CHI, the phone utilized by the agent 150 converts the RTP stream back into sound to facilitate a conversation between the agent 150 and the caller 101. According to one embodiment, the phone utilized by the agent 150 is a standard computer, and the conversion of the RTP stream is performed by software called a softphone and the use of a sound card. Alternatively, the RTP stream can be converted by an external plug-on USB adapter hooked up to a telephone head set of the agent 150.

Multiple Gateways

FIG. 1 discloses multiple gateways 108, 109 available to interface between the PSTN 104 and HUB-A 115. Architectures incorporating only a single gateway are limited in that, if a single gateway 108, 109 fails, the entire Contact Center 100 is shut down until the gateway 108, 109 is brought back on line or replaced. The use of multiple gateways 108, 109 therefore makes the Contact Center 100 less dependent on a single gateway 108, 109.

According to a prior art model, a single gateway comprises twelve channels for interfacing between a PSTN 104 and a VoIP. In most real-world applications, the number of channels will be far greater than six or twelve channels. Because the prior art architecture utilizes a single gateway, if the gateway fails, all contact center 100 communications fail. It is the only interface between the PSTN and the VoIP.

Referring back to FIG. 1, in the architecture of the preferred embodiment of the present invention, dual gateways 108, 109, act to interface a total of ninety two channels. When both gateways 108, 109 are operating at a full capacity of six callers 101 per gateway 108, 109, their total capacity equals that of the gateway of the prior art. An advantage of utilizing multiple gateways 108, 109 as illustrated by FIG. 1 is that if a gateway 108, 109 fails, the Contact Center 100 will not experience catastrophic failure. The remaining gateway(s) continue to be functional. The illustration of a two gateway 108, 109 network in FIG. 1 is illustrative. According to the multiple gateway 108, 109 architecture, any number of parallel gateways 108, 109 can be added. As more parallel gateways 108, 109 are added, the failure of one gateway 108, 109 accounts for a lower percentage of the total interface capability. For example, with only two gateways 108, 109 as depicted in FIG. 1, a failure of one gateway 108, 109 reduced the channel interface capacity by 50%. In contrast, if a system comprised ten parallel gateways 108, 109, the failure of one gateway 108, 109 would only reduce the capability of the system by ten percent. Although the present invention envisions applications comprising as few as two or three parallel gateways 108, 109, and as many as a thousand parallel gateways 108, 109, according to the preferred embodiment, systems will advantageously comprise between four and twenty gateways 108, 109.

Those skilled in the art will recognize that the numbers of channels contained in the gateways 108, 109 depicted in FIG. 1 are exemplary only, and that in actual application, such interface architectures will advantageously provide interface capability for a far greater number of channels. Similarly, the number of complimentary gateways 108, 109 is not limited to two gateways 108, 109, a number selected for exemplary purposes only.

Still referring to FIG. 1, a third gateway 140 is illustrated as connected to the VAS media server 122, which couples directly to the Houston Node, HOU. Although the architecture depicts nodes HOU, CHI and STL as components of HUB-A 115, this architecture can be nominal. The separate nodes can duplicate the functionality of the "master" components in HUB-A 115. An advantage to this can be understood by considering the centralized and decentralized aspects of many modern Contact Centers 100. For example, ABC, a national automobile rental company, has a toll free number that it advertises on bill boards, free travel maps and other advertising media. According to the FIG. 1, gateways 108 and 109 are located at the national center where some, or possibly all toll free calls are directed. A local telephone number (or several numbers) within the Houston area-code allows clients to call one or several Houston offices of ABC car rental company. Local calls are received directly through gateway 140 rather than over the LAN 119 from the central office of HUB-A 115.

In this improved architecture of the present invention, the gateway 108, 109 is the last single point of failure. The preferred embodiment of the present invention includes using a plurality of gateways 108, 109, 140 at each place where customer traffic connects to the PSTN 104. FIG. 1 depicts three gateways 108, 109, 140 in the VoIP architecture. Of course, more or less gateways 108, 109 may be utilized as required. FIG. 1 should in no way limit the present invention to three gateways 108, 109, 140. Referring back to FIG. 1, the failure of a single gateway 108, 109 will only reduce the overall capacity of this connection by a percentage of 20%–33%, depending upon the number of gateways 108, 109, e.g., if one gateway 108, 109 fails in a three gateway 108, 109 system, a 33% reduction will be realized. The gateway 108, 109 is designed to also be economically viable at this smaller size. A typical gateway 108, 109 can be configured with one to four spans with each span capable of handling twenty three to twenty four live voice conversations. If a customer has a location with very low traffic that only needs part of one span, then they can order two spans and two one-port gateways to provide a solution that can tolerate the failure of either span and/or either gateway 108, 109. Another example would be a customer that needed sixteen spans to carry their load who might buy twenty spans, and five four-port gateways 108, 109. This would permit the failure of any single gateway 108, 109 while still providing the needed capacity.

Prioritized Proxy Server Table

Referring first to FIG. 1, multiple proxy servers such as proxy server 112 can be placed in parallel. When a call comes in, the SIP stream can then be routed to all parallel proxy servers simultaneously. Disadvantages of a parallel approach, however, a lot of unnecessary parallel work occurs. Moreover, both the incoming SIP stream, and the responsive traffic generated by multiple proxy servers increases the amount of network traffic. FIG. 2 illustrates a proxy server table 300 for selecting proxy servers among a plurality of proxy servers according to a priority scheme. As discussed in conjunction with FIGS. 2 and 3, when the gateway 108 in FIG. 1 receives an incoming call, it seeks an operational proxy server according to the prioritization of servers listed in table 300 of FIG. 2. Within the proxy table 300 of FIG. 2, each proxy server is identified by an address in the proxy address field 302. The proxy address field 302 is shown for exemplary purposes only and the table 300 should not be construed as having the only possible set of proxy addresses. In conjunction with each proxy address 302, the table 300 comprises a time-out value 304. The time-out values 304 are illustrated in milliseconds. If the first proxy server (in this example 192.168.0.1) in the proxy server table 300 does not respond within 36 milliseconds, the gateway increments to the next level 306 one proxy server address 302, which is address 192.168.0.2. The time-out value 304 for proxy 192.168.0.2 is listed as 120 milliseconds. If proxy 192.168.0.2 does not respond to the SIP inquiry from the gateway 108 in the allotted time, the system then seeks a response from proxy 192.168.37.1, which is shown to be a level 2 priority in FIG. 2. According to this system of prioritization, the Contact Center 100 (FIG. 1) can insure that the most appropriate proxy server handles an incoming call. There are two level one proxy addresses in the proxy table 300 of FIG. 2.

Still referring to FIGS. 1 and 2, exemplary time-out values 304 are listed in the table 300 in correlation to their respective proxy servers, which are identified by address 302. The first proxy server, address 192.168.0.1 and further identified as the proxy server 112 of FIG. 1 has a time-out value 304 of only thirty six milliseconds. According to the preferred embodiment, servers that can respond more quickly are located at a higher level in the level field 306, and servers that will respond more slowly are designated at a lower level in the level field 306, according to the level field 306 of table 300. As illustrated in table 300, in most applications of the present invention, proxy servers listed in the lower levels of the level field 306 will advantageously be assigned a longer time-out 304 period than the proxy servers listed at higher levels 306. Embodiments are envisioned however wherein some higher level 306 proxy servers will be assigned longer time-out 304 periods than some lower level 306 proxy servers. Proxy server of address 192.168.0.2, which may be located in the VAS media server of FIG. 1, has been assigned a time-out 304 period of 120 ms according to the FIG. 2. Both proxy servers 192.168.0.1 and 192.168.0.2 are "level 1" 306 proxy servers and are not distinguished by pointers 308, the function of which is described in greater detail in conjunction with FIG. 3.

According to the preferred embodiment, when proxy servers of a same level 306 are not distinguished by a pointer 308, the process always begins with the first sequential proxy server, which is 192.168.0.1, and advances only to the next server at that level 306, 192.168.0.2, only if the previous server times out. In level 1 of the table 300, the proxy server addresses 192.168.0.1, 192.168.0.2. and any other address that may appear in level 1 more typically points to a local hub proxy. In level two of the table 300, the proxy server address 192.168.37.1 more typically points to a proxy in a remote hub, while the level 3 proxies point to a node. A table in a typical gateway may be different from other gateways in the same system because it may be more effective to speak to a proxy local to the gateway. As noted, the server in the VAS media server 122 in FIG. 1 is on the same local area network (LAN) as HUB-A 115, and is therefore more quickly accessed than the other proxy servers 130, 134 which are accessible only through a wide area network (WAN). The proxy server in VAS media server 122 is therefore assigned a "level 2" 306 priority in FIG. 2, whereas proxy servers 130 and 134 are assigned a "level 3" 306 priority in FIG. 2. In the case where there are no additional entries in the proxy address field 302 with a corresponding number in the level field 306, the caller 101 will be routed to a default mode (as depicted in the proxy address field 302 of the proxy server priority table 300). Preferably, when a caller 101 enters the default mode, the caller 101 is notified that the Contact Center 100 is unavailable and therefore can not answer the caller 101 at this time. This notification is preferably followed by a "fast busy" signal indicating that the caller 101 has been disconnected and should call back at a later time. By managing the incoming calls from the gateway 108 according to a proximity server table 306 as in FIG. 2, redundancy is built into the system through the use of existing proxy servers, thereby increasing the reliability and overall speed of the system with little additional hardware or other expenses. By spreading the workflow through the use of pointers 308, the individual nodes will evenly share the unexpected load caused by the extra traffic that would normally have been handled by proxy servers at level 1 or 2.

Figure 3:
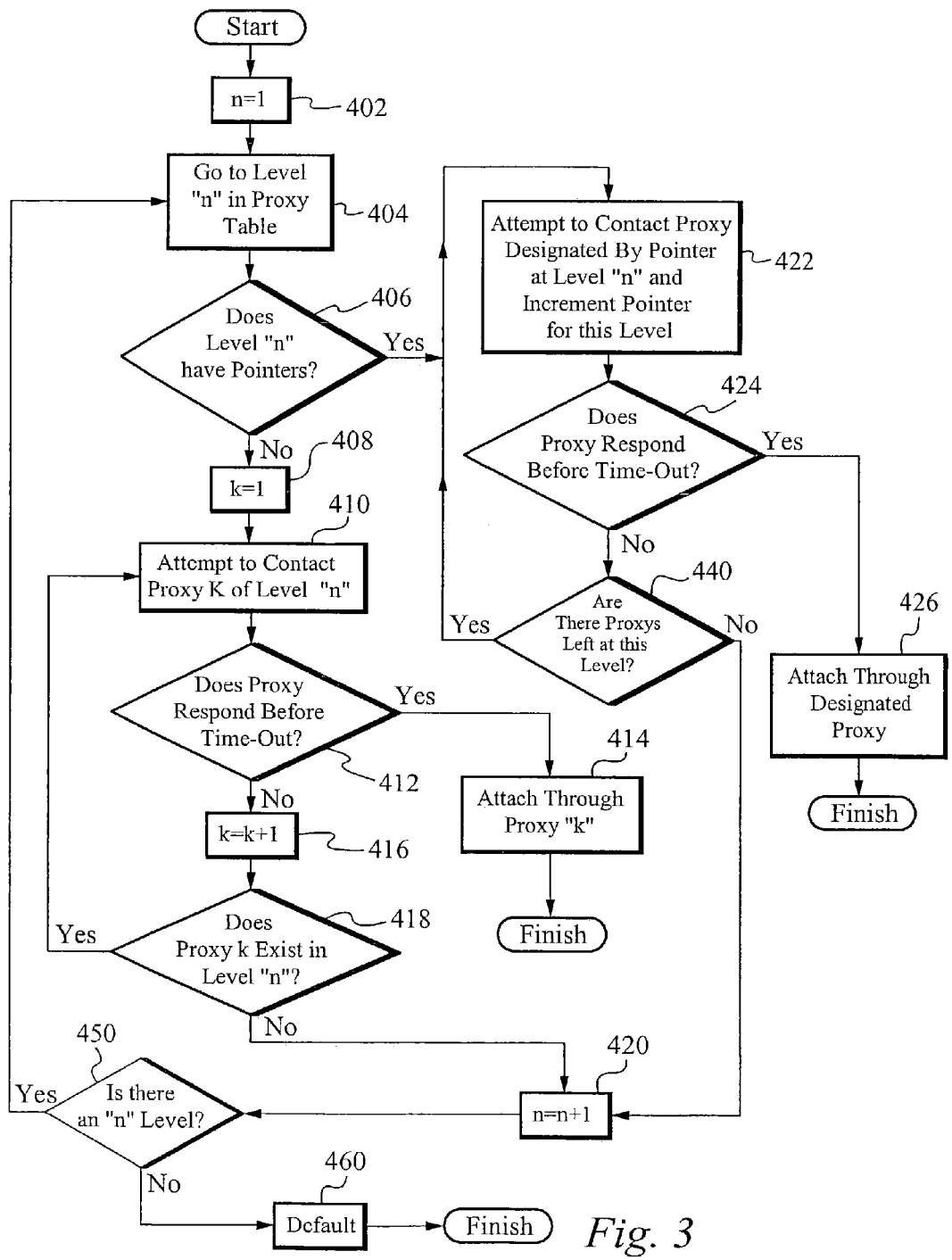
FIG. 3 illustrates a flow chart of the preferred embodiment of the present invention.

The table of FIG. 2 is explained in conjunction with the method disclosed in FIG. 3. In the step 402, the level "n" (306) of FIG. 2 is set to "1." In the step 404, the level "n" proxy servers within the table are identified. In the step 406, if level "n" has pointers, the process advances to the step 422, wherein contact is attempted with the proxy designated by a pointer and the pointer is incremented to the next proxy for this level. In the step 424, if the proxy responds prior to the time out, the gateway attaches through the proxy designated by the pointer in the step 426 before the method ends. If the proxy does not respond before a time out in the step 424, it is then determined whether there are any proxies left at the current "n" level in step 440. If there are no proxies left, then the level is incremented in step 420. However, if there are proxies left, the method returns to the step 422, and attempts to the next proxy in that particular "n" level. The advantage of the steps 422, 424, 426 and 440 can be understood in that proxy servers at a level requiring pointers are not the primary proxy servers, and are only invoked when the primary or preferred proxy servers fail to answer. As a result the proxy servers at level 3 (306) of FIG. 2 are connected by WANs 124, 126 to the gateway 108, which is a slower transmission medium than a LAN. Proxy servers 130, 136 have already been assigned different tasks associated with their nodes and ideally should not be overloaded with all incoming calls that have been dropped by an offline system. By assigning pointers and rotating through the available third level proxy servers, the system will avoid overloading one of the lower priority proxy servers and optimally share load when the primary proxys are not responding.

Returning back to the step 406 in FIG. 3, if level "n" does not have pointers, it is preferably a higher level proximity server and the method advances to step 408. However, embodiments are envisioned wherein higher level proxy servers are identified by pointers 308 as well. In the step 408, the sequential proxy number "k" is set to "1." This sequential proxy number is not to be confused with the proxy address, the proxy number being unrelated to the sequence of listing within the proxy table. In the step 410, contact is attempted with proxy "k" of level "n." If, according to the step 412, the proxy responds before the time out is reached, according to the step 414, the SIP stream attaches through the identified proxy, and the method is again finished. If according to the step 412 the proxy does not respond before the time out, then according to the step 416, the value "k" is incremented by "1." In step 418, if the sequential proxy "k" exists, the method returns to the step 410, and an attempt is made to engage the newly identified proxy. If no proxy "k" exists at that level, the level "n" is incremented by "1" in step 420. After the level "n" is incremented in step 420, it is determined in step 450 whether there is a level "n." If there is a level "n", then the step 404, identifying the next level of proxy servers. However, if no "n" level exists, the default step 460 starts. Preferably, the default step 460 notifies the particular caller that the system is experiencing technical difficulty. Preferably, this notification is followed by a "fast busy" signal and then the method is again finished.

Another aspect of the preferred embodiment of the present invention is realizing that network elements occasionally fail, and unlike a standard VoIP call that just hangs until one or the other parties disconnect, we would prefer to restart the call and if possible reconnect to the original agent 150 or party. In the Contact Center 100, time is spent when the contact initially is connected to the system identifying who they are, what they want to do, etc. This information is used to route the call to an appropriate person. In many cases there are multiple agents 150 who can help the person in an equivalent manner. The idea is to save application specific information about the call at the gateway as the call progresses through the system. If the call is broken by the failure of the network itself or by a network element such as a conference bridge or a rebooting PC, the gateway 108, 109 can maintain the connection to the caller 101 and re-present the call to the system with the accumulated application specific data. The system can then determine this is not a "new" call, but instead is a call that was in progress and using this information restart the call, perhaps back to the original destination agent 150, or at least to one that has similar skills. Also, voice prompts could be played at the gateway, or by network devices along the way that inform the original caller 101 to the effect that "we are sorry to inform you that we are experiencing network difficulties but are attempting to re-route your call, please hold."

If a Contact Center 100 node went offline, a call being restarted via this method would likely need to be put on hold waiting for an agent 150 with the right skills to come available elsewhere. In this case the call would ideally be given a high priority to be handled before others who were not unexpectedly disconnected, and an informative greeting would be played to the caller 101 telling them something to the effect that "we regret we were unable to re-connect your call but we are putting you on hold while we locate the next available agent 150". Using the SIP protocol, this scheme is implemented by using the session description protocol (SDP) body 503 and as the call progresses through various network devices such as media servers and conference bridges, application specific data is transmitted as it is accumulated to the gateway 108, 109 using data in the SDP body 503 along with the call signaling.

Referring to FIG. 1, the gateway 108, 109 accumulates this information and optionally presents all it has collected when a call is restarted. A new call that is initially connecting starts with only the incoming call's number dialed and the calling party's number (DNIS and ANI). As the call interacts with HUB-A 115, things such as an account number, a call type classification, customer ranking (gold, platinum), etc. are typically added to this information stored by the gateway 108, 109. After a failure, which the gateway 108, 109 detects by either a SIP message to that effect, timeouts of the SIP protocol to the connected element(s), or the interruption of the RTP to the gateway 108, 109 will initiate this restart with the accumulated application data. In a regular VoIP network, if the RTP stream fails, the gateway will simply hang up or the caller 101 hears nothing and usually "gives up" and disconnects after waiting 20–50 seconds and then calls back. In this preferred embodiment, the restart sequence will initiate typically within 4 seconds. By the time 3 seconds of RTP is missing, something is seriously wrong, yet the caller 101 is still available to re-route the call. This concept is explained in further detail below.

Recovery After Loss of Signal

The ability to recover quickly and seamlessly from a voice connection failure is an important aspect in preserving satisfaction and good will among clients calling into a contact center. Referring again to FIG. 1, assume that a call enters the Contact Center 100 from the PSTN 104 at gateway 108 and is routed to agent HOU-1 through the VAS media server 122. Assume further that the RTP stream carrying, voice data that is routed through the VAS media server 122 fails. In such an event, both the calling party and the agent HOU-1 hear nothing. The parties typically make inquiries for a few moments to see if they are still connected, and then hang up, as few as in ten seconds or less. Transmission faults of this nature are not uncommon to telephony, and can occur as a result of any number of faults, including a faulted VAS media server 122, a faulted data network, or a faulted telephone of the agent HOU-1 Telephone faults are increasingly prone to occur as network Contact Centers 100 move toward computer based telephones. If an agent 150 is speaking with a customer through a computer or if the computer crashes, the connection is terminated. Moreover, many digital devices are repaired "on the fly" with replacement parts pulled out and re-inserted while the network is in use. Such repairs interrupt the data stream at least until the replacement part is re-inserted. If re-booting is required, the recovery time can be even longer. If, for example, a router is replaced in a span of forty five seconds, thereby interrupting a data stream for that time period, most consumers will have hung up before service is resumed. For this reason, from consumer standpoint, on-the-fly repairs are virtually indistinguishable from system faults. Both constitute "apparent" system failure.

Private branch exchange (PBX) networks are the inhouse telephone switching systems that interconnect telephone extensions to each other as well as to the PSTN 104. PBXs are increasingly incorporating VoIP capability. The digital faults of a VoIP network are therefore more commonly imposed on PBX networks. In contrast to the apparent system failure rate of software driven/router enabled internet and VoIP networks today, the historic failure rate of the PSTN 104 is relatively low. Because of this low level of system reliability over the PSTN 104, the average consumer expects high levels of system reliability from PBXs and VoIP networks. As noted, however, the typical means of fault correction in a VoIP network is for a party to hang up and re-dial. Moreover, for true system faults, such as a VAS media server 122 going down, this is basically the only means of recovery in a conventional VoIP design.

The costs of such a call to a consumer include actual monetary expenses, the time to dial, time spent on hold, which is often three to five minutes, and sometimes twenty to thirty minutes, the time spent explaining a problem or request to an agent 150, any time spent being re-routed to different agents 150, etc. In other words, customer satisfaction will suffer greatly. If a disconnect occurs, most often, there is no "quick" way back in the system. The customer must repeat the process. Moreover, no benefit typically inures to a caller 101 until the end of a call, wherein an order is placed or a grievance settled. For these reasons, when a customer is disconnected or forced to hang up prematurely, the cost/benefit ratio becomes infinite. That is, there have been costs in time, energy, and possibly monetary expenses, but no benefits to the caller 101. This can create extreme frustration, particularly if the delays or costs have been significant. The dialing, the waiting, the routing from operator to agent 150 to find a proper agent 150, and the discussion with the agent 150 must then be repeated by an already frustrated customer.

Call Restoration Data Tables and Key Value Pairs

Figures 4, 5:
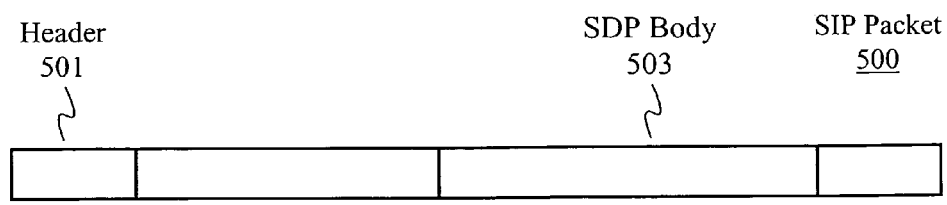
FIG. 4 illustrates SIP user data that is being accumulated during the contact's progress through the Contact Center of the present invention.
FIG. 5 illustrates an exemplary call restoration data table of the present invention.

The present invention envisions storing active call data in a data table, preferably within a gateway 108, 109, so that if a call is interrupted through a system failure, the call can be reconnected with minimal difficulty. FIG. 4 illustrates a SIP packet 500 including header 501, and a SDP body 503. The data within the SDP body 503 includes data essential to the connection, such as the ANI, the DNI, etc. It should be understood that the SIP packet 500 contains standard SIP data in addition to the header 501 and the SDP body 503. The SIP packet 500 as depicted is exemplary only and has been simplified for the purposes of this disclosure to show that the SDP body 503 is an extension to an existing SIP packet 500. The SDP body 503 will contain key value pairs.

The following description of FIG. 5 will describe one of many embodiments of the present invention pertaining to the organization of the SDP body 503 containing key value pairs in the gateway 108, 109. FIG. 5 is one example of such organization and should not be construed as the sole embodiment.

Data from the SDP body 503 is stored in the call restoration data table 600 shown in FIG. 5. The call restoration data table 600 is preferably a digital memory table located within the gateway 108, 109 on a calling user channel basis. As a result of storing back-up call data within a call restoration data table 600, if a component fails such that the voice connection between two parties is severed, even if the SIP stream fails, the call data can be retrieved from the call restoration data table to facilitate re-connection of the parties. FIG. 5 includes a call restoration table 600, illustrating the storage of values including those values stored within the SDP body 503 of the SIP packet 500.

FIG. 5 represents the data as stored in a digital storage device, typically each gateway 108, 109, somewhere in the call center of the Contact Center 100. Because it is envisioned that the data within the table is provided by the SIP stream, according to one embodiment, the data in the table 600 is identical to the data in the SDP body 503 of a SIP packet 500. According to alternative embodiments, however, there can be data within the table 600 which was not received from the SIP stream. These figures are therefore discussed concurrently. Table 600 embodies dual codes or "key value pairs," wherein the left hand registers 602-612 define the purpose or function of the values in the right hand registers 612–622.

The fields or registers of table 600 can be of varying sizes depending on the amount of data required. According to the present invention, as a call comes into the gateway 108, the ANI and DNI are inserted into the table 600. As illustrated in FIG. 1, the SIP stream is routed from the gateway 109 to the VAS 111. Data added to the table 600 is drawn from a variety of sources. Within table 600, the left hand fields 604–611 represent "field option" codes, and the right hand "value" fields represent the corresponding values assigned to the field options. For example, "Incoming Caller" defines a function as a calling party number or ANI number in field 604. The adjacent value field includes "214-555-1212" which represents the actual phone number of the incoming caller 101. The second field option in table 600 is the "call purpose" field 606, represented here by "Billing Inquiry." The purpose of the incoming call 602 is a billing inquiry 616. The determination that the caller's 101 purpose was a "billing inquiry" could have been made according to menu options selected by the caller 101. Alternatively, the phone number through which the caller 101 contacted the enterprise could be a line reserved for billing inquiries. Credit card companies, for example, often have dedicated lines to report lost or stolen credit cards.

The field option 611 contains "DNI" (dialed number identification) indicating that the adjacent field 622 contains the phone number originally dialed, illustrated as a toll-free number "(1-800-246-1000)." The fields in table 600 are exemplary only, and any number of other fields can be present as well. According to the preferred embodiment of the present invention, however, table 600 will always include the ANI or calling number, and the DNI or called number.

An important function of the data depicted in FIGS. 4 and 5 relates to restoring communication when the RTP stream is cut off. According to the present invention, the gateway 108 is configured to detect that the RTP stream has been interrupted. In the event that the gateway 108 determines that the RTP stream has been interrupted, the gateway 108 re-sends the call to the VAS 111 complete with the data in table 600. The caller 101 would be given a warning such as "... we are currently experiencing technical difficulties ..." or "... please hold while we re-route your call ..." and then the call would be re-presented to the VAS 111 for handling using the collected data. A copy of the data is stored as key value pairs at the gateway 108, 109 for emergency recovery use. The actual variables are stored and passed within the regular workflow. Similarly, if any element failed other than the gateway 108, 109, the data record would identify that the call had been to agent HOU-1 in Houston. The call center could route the RTP stream of the call to the VAS/media server 122. Detection of a line fault and re-routing facilitated by a data table such as table 600 can be accomplished so quickly that the inconvenience to the caller 101 and the agent 150 is minimized.

The ability to recover quickly and seamlessly from a voice connection failure is an important aspect in preserving satisfaction and good will among clients calling into a contact center. Referring again to FIG. 1, assume that a call enters the Contact Center 100 from the PSTN 104 at gateway 108 and is routed to agent HOU-1 through the VAS media server 122. Assume further that an element in the path of the RTP stream carrying voice data that is routed through the VAS media server 122 fails. Such element may be an RTP endpoint, namely agent HOU-1 or the VAS media server 122, or a network infrastructure element—a router or a switch. In such an event, the gateway 108 will immediately receive a notification from the closest functioning router, or in the case of an RTP endpoint application failure—from the operating system that was hosting that application. Such notifications are dispatched using internet control message protocol (ICMP). Once the gateway 108 receives an ICMP notification that one or more of the RTP packets it dispatched has failed to reach its intended destination, it takes steps to restore the call.

Because gateways are often designed with more hardware and less loadable software, gateways are often one of the lower failing members of a network. Accordingly, a call data table 600 can advantageously be stored in each gateway, thereby minimizing the possibility of losing the call data table 600 due to a component or system level failure. Moreover, by maintaining parallel gateways as discussed above, and recording the table 600 in multiple parallel gateways, even if one gateway 108 fails, a table 600 exists in each gateway. By this redundancy, if some part of the network other than the gateway 108, 109 fails, the RTP signal can still be reestablished by the table 600 in the alternate gateway.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention.

What is claimed is:

1. A high availability voice over internet protocol system coupled to a voice telephony network, comprising:
   a. a plurality of gateways configured to receive at least one voice call from the voice telephony network, wherein the plurality of gateways are coupled to at least one hub;
   b. a proxy table configured in each of the plurality of gateways, wherein the plurality of gateways send the at least one voice call to one of at least one proxy server; and
   c. a call restoration data table configured in each of the plurality of gateways, wherein the call restoration data table provides data to restore a lost voice call of the at least one voice call.

2. The system as claimed in claim 1 wherein the at least one hub coupled to the plurality of gateways is configured to receive the at least one voice call from the plurality of gateways, further wherein the at least one voice call is divided by the plurality of gateways into a session initiation protocol portion and a real time protocol portion.

3. The system as claimed in claim 2 wherein the at least one hub includes the at least one proxy server, the at least one proxy server configured to receive the session initiation protocol portion of the at least one voice call.

4. The system as claimed in claim 2 further comprising at least one media server configured in the at least one hub, the at least one media server configured to receive the real time protocol portion for the at least one voice call.

5. The system as claimed in claim 1 wherein the at least one hub includes an application server coupled by an interface logic device to communicate with the at least one proxy server and a media server.

6. The system as claimed in claim 1 further comprising at least one node coupled to each of the at least one hub with a wide area network connection, wherein the at least one node includes a single proxy server and a single media server.

7. The system as claimed in claim 1 further comprising at least one node coupled to each of the at least one hub with a local area network connection, wherein the at least one node includes a single proxy server and a single media server.

8. The system as claimed in claim 1 wherein the plurality of gateways are configured such that when one of the plurality of gateways fails, the remainder of the plurality of gateways remain operational.

9. The system as claimed in claim 1 further comprising a load balancing switch for directing any of the at least one voice call to the plurality of gateways.

10. The system as claimed in claim 1 wherein the proxy table selects the appropriate one of the at least one proxy server based on a priority scheme.

11. The system as claimed in claim 1 wherein the data provided to the call restoration data table is transmitted to the call restoration data table in a session initiation protocol packet, further wherein the session initiation protocol packet includes a header and a Session Description Protocol (SDP) body.

12. The system as claimed in claim 11 wherein the data provided to the call restoration data table is stored as a key value pair, further wherein the key value pair is derived from the header and the SDP body.

13. A method of providing a high availability voice over internet protocol system, comprising:
   a. configuring a plurality of gateways between a voice telephony network and at least one hub;
   b. implementing a proxy table and a call restoration data table in each of the plurality of gateways;
   c. receiving in the plurality of gateways at least one voice call from the voice telephony network;
   d. dividing the at least one voice call into a session initiation protocol portion and a real time protocol portion;
   e. sending the session initiation protocol portion of the at least one voice call to one of at least one proxy server, the at least one proxy server being located in the at least one hub, according to the proxy table; and
   f. sending the real time protocol portion of the at least one voice call to a media server, the media server configured in the at least one hub.

14. The method as claimed in claim 13 further comprising restoring a lost call of the at least one voice call with data provided to the call restoration data table.

15. The method as claimed in claim 13 wherein the at least one hub includes an application server coupled by an interface logic device to communicate with the at least one proxy server and the media server.

16. The method as claimed in claim 13 wherein at least one node is coupled to each of the at least one hub with a wide area network connection, further wherein the at least one node includes a single proxy server and a single media server.

17. The method as claimed in claim 13 wherein at least one node is coupled to each of the at least one hub with a local area network connection, further wherein the at least one node includes a single proxy server and a single media server.

18. The method as claimed in claim 13 wherein the plurality of gateways are configured such that when one of the plurality of gateways fails, the remainder of the plurality of gateways remain operational.

19. The method as claimed in claim 13 further comprising directing any of the at least one voice calls to the plurality of gateways with a load balancing switch.

20. The method as claimed in claim 13 wherein the proxy table selects the appropriate one of the at least one proxy server based on a priority scheme.

21. The method as claimed in claim 13 wherein the data provided to the call restoration data table is transmitted to the call restoration data table in a session initiation protocol packet, further wherein the session initiation protocol packet includes a header and a Session Description Protocol (SDP) body.

22. The method as claimed in claim 21 wherein the data provided to the call restoration data table is stored as a key value pair, further wherein the key value pair is derived from the header and the SDP body.

23. A high availability voice over internet protocol-system coupled to a voice telephony network, comprising:
  a. means for configuring a plurality of gateways between a voice telephony network and at least one hub;
  b. means for implementing a proxy table and a call restoration data table in each of the plurality of gateways;
  c. means for receiving in the plurality of gateways at least one voice call from the voice telephony network;
  d. means for dividing the at least one voice call into a session initiation protocol portion and a real time protocol portion;
  e. means for sending the session initiation protocol portion of the at least one voice call to one of at least one proxy server, the at least one proxy server being located in the at least one hub, according to the proxy table; and
  f. means for sending the real time protocol portion of the at least one voice call to a media server, the media server configured in the at least one hub.

24. The system as claimed in claim 23 further comprising means for restoring a lost call of the at least one voice call with data provided to the call restoration data table.

25. The system as claimed in claim 23 wherein the at least one hub includes an application server coupled by an interface logic device to communicate with the at least one proxy server and the media server.

26. The system as claimed in claim 23 wherein at least one node is coupled to each of the at least one hub with a wide area network connection, further wherein the at least one node includes a single proxy server and a single media server.

27. The system as claimed in claim 23 wherein at least one node is coupled to each of the at least one hub with a local area network connection, further wherein the at least one node includes a single proxy server and a single media server.

28. The system as claimed in claim 23 wherein the plurality of gateways are configured such that when one of the plurality of gateways fails, the remainder of the plurality of gateways remain operational.

29. The system as claimed in claim 23 further comprising means for directing any of the at least one voice calls to the plurality of gateways with a load balancing switch.

30. The system as claimed in claim 23 wherein the proxy table selects the appropriate one of the at least one proxy server based on a priority scheme.

31. The system as claimed in claim 23 wherein the data provided to the call restoration data table is transmitted to the call restoration data table in a session initiation protocol packet, further wherein the session initiation protocol packet includes a header and a Session Description Protocol (SDP) body.

32. The system as claimed in claim 31 wherein the data provided to the call restoration data table is stored as a key value pair, further wherein the key value pair is derived from the header and the SDP body.

33. A high availability voice over internet protocol system coupled to a voice telephony network, comprising:
  a. a plurality of gateways configured to receive at least one voice call from the voice telephony network, wherein the plurality of gateways are coupled to at least one hub;
  b. a proxy table configured in each of the plurality of gateways, wherein the plurality of gateways send the at least one voice call to one of at least one proxy server and the proxy table selects the appropriate one of the at least one proxy server based on a priority scheme; and
  c. a call restoration data table configured in each of the plurality of gateways, wherein the call restoration data table provides data to restore a lost voice call of the at least one voice call wherein the data provided to the call restoration data table is transmitted to the call restoration data table in a session initiation protocol packet, further wherein the session initiation protocol packet includes a header and a Session Description Protocol (SDP) body.

34. The system as claimed in claim 33 wherein the at least one hub coupled to the plurality of gateways is configured to receive the at least one voice call from the plurality of gateways, further wherein the at least one voice call is divided by the plurality of gateways into a session initiation protocol portion and a real time protocol portion.

35. The system as claimed in claim 34 wherein the at least one hub includes the at least one proxy server, the at least one proxy server configured to receive the session initiation protocol portion of the at least one voice call.

36. The system as claimed in claim 34 further comprising at least one media server configured in the at least one hub, the at least one media server configured to receive the real time protocol portion for the at least one voice call.

37. The system as claimed in claim 33 wherein the at least one hub includes an application server coupled by an interface logic device to communicate with the at least one proxy server and a media server.

38. The system as claimed in claim 33 further comprising at least one node coupled to each of the at least one hub with a wide area network connection, wherein the at least one node includes a single proxy server and a single media server.

39. The system as claimed in claim 33 further comprising at least one node coupled to each of the at least one hub with a local area network connection, wherein the at least one node includes a single proxy server and a single media server.

40. The system as claimed in claim 33 wherein the plurality of gateways are configured such that when one of the plurality of gateways fails, the remainder of the plurality of gateways remain operational.

41. The system as claimed in claim 33 further comprising a load balancing switch for directing any of the at least one voice call to the plurality of gateways.

42. The system as claimed in claim 33 wherein the data provided to the call restoration data table is stored as a key value pair, further wherein the key value pair is derived from the header and the SDP body.

43. A high availability voice over internet protocol system coupled to a voice telephony network, comprising:
  a. a plurality of gateways configured to receive at least one voice call from the voice telephony network, wherein the plurality of gateways are coupled to at least one hub; and
  b. a call restoration data table configured in each of the plurality of gateways, wherein the call restoration data table provides data to restore a lost voice call of the at least one voice call.

44. The system as claimed in claim 43 further comprising a proxy table configured in each of the plurality of gateways, wherein the plurality of gateways send the at least one voice call to one of at least one proxy server.

45. The system as claimed in claim 44 wherein the at least one hub coupled to the plurality of gateways is configured to receive the at least one voice call from the plurality of gateways, further wherein the at least one voice call is divided by the plurality of gateways into a session initiation protocol portion and a real time protocol portion.

46. The system as claimed in claim 45 wherein the at least one hub includes the at least one proxy server, the at least one proxy server configured to receive the session initiation protocol portion of the at least one voice call.

47. The system as claimed in claim 45 further comprising at least one media server configured in the at least one hub, the at least one media server configured to receive the real time protocol portion for the at least one voice call.

48. The system as claimed in claim 44 wherein the at least one hub includes an application server coupled by an interface logic device to communicate with the at least one proxy server and a media server.

49. The system as claimed in claim 44 wherein the proxy table selects the appropriate one of the at least one proxy server based on a priority scheme.

50. The system as claimed in claim 43 wherein the data provided to the call restoration data table is transmitted to the call restoration data table in a session initiation protocol packet, further wherein the session initiation protocol packet includes a header and a Session Description Protocol (SDP) body.

51. The system as claimed in claim 50 wherein the data provided to the call restoration data table is stored as a key value pair, further wherein the key value pair is derived from the header and the SDP body.

52. The system as claimed in claim 43 further comprising at least one node coupled to each of the at least one hub with a wide area network connection, wherein the at least one node includes a single proxy server and a single media server.

53. The system as claimed in claim 43 further comprising at least one node coupled to each of the at least one hub with a local area network connection, wherein the at least one node includes a single proxy server and a single media server.

54. The system as claimed in claim 43 wherein the plurality of gateways are configured such that when one of the plurality of gateways fails, the remainder of the plurality of gateways remain operational.

55. The system as claimed in claim 43 further comprising a load balancing switch for directing any of the at least one voice call to the plurality of gateways.

56. A method of providing a high availability voice over internet protocol system, comprising:
  a. configuring a plurality of gateways between a voice telephony network and at least one hub;
  b. implementing a proxy table and also a call restoration data table in each of the plurality of gateways;
  c. receiving in the plurality of gateways at least one voice call from the voice telephony network;
  d. dividing the at least one voice call into a session initiation protocol portion and a real time protocol portion;
  e. sending the session initiation protocol portion of the at least one voice call to one of at least one proxy server, the at least one proxy server being located in the at least one hub, according to the proxy table, wherein the proxy table selects the appropriate one of the at least one proxy server based on a priority scheme; and
  f. sending the real time protocol portion of the at least one voice call to a media server, the media server configured in the at least one hub.

57. The method as claimed in claim 56 further comprising restoring a lost call of the at least one voice call with data provided to the call restoration data table.

58. The method as claimed in claim 56 wherein the at least one hub includes an application server coupled by an interface logic device to communicate with the at least one proxy server and the media server.

59. The method as claimed in claim 56 wherein at least one node is coupled to each of the at least one hub with a wide area network connection, further wherein the at least one node includes a single proxy server and a single media server.

60. The method as claimed in claim 56 wherein at least one node is coupled to each of the at least one hub with a local area network connection, further wherein the at least one node includes a single proxy server and a single media server.

61. The method as claimed in claim 56 wherein the plurality of gateways are configured such that when one of the plurality of gateways fails, the remainder of the plurality of gateways remain operational.

62. The method as claimed in claim 56 further comprising directing any of the at least one voice calls to the plurality of gateways with a load balancing switch.

63. The method as claimed in claim 56 wherein the data provided to the call restoration data table is transmitted to the call restoration data table in a session initiation protocol packet, further wherein the session initiation protocol packet includes a header and a Session Description Protocol (SDP) body.

64. The method as claimed in claim 63 wherein the data provided to the call restoration data table is stored as a key value pair, further wherein the key value pair is derived from the header and the SDP body.

65. A method of providing a high availability voice over internet protocol system, comprising:
 a. configuring a plurality of gateways between a voice telephony network and at least one hub;
 b. implementing a call restoration data table in each of the plurality of gateways;
 c. receiving in the plurality of gateways at least one voice call from the voice telephony network;
 d. dividing the at least one voice call into a session initiation protocol portion and a real time protocol portion;
 e. sending the session initiation protocol portion of the at least one voice call to one of at least one proxy server, the at least one proxy server being located in the at least one hub;
 f. sending the real time protocol portion of the at least one voice call to a media server, the media server configured in the at least one hub; and
 g. restoring a lost call of the at least one voice call with data provided to the call restoration data table.

66. The method as claimed in claim 65 further comprising implementing a proxy table in each of the plurality of gateways, wherein the session initiation protocol portion is sent according to the proxy table.

67. The method as claimed in claim 66 wherein the proxy table selects the appropriate one of the at least one proxy server based on a priority scheme.

68. The method as claimed in claim 65 wherein the at least one hub includes an application server coupled by an interface logic device to communicate with the at least one proxy server and the media server.

69. The method as claimed in claim 65 wherein at least one node is coupled to each of the at least one hub with a wide area network connection, further wherein the at least one node includes a single proxy server and a single media server.

70. The method as claimed in claim 65 wherein at least one node is coupled to each of the at least one hub with a local area network connection, further wherein the at least one node includes a single proxy server and a single media server.

71. The method as claimed in claim 65 wherein the plurality of gateways are configured such that when one of the plurality of gateways fails, the remainder of the plurality of gateways remain operational.

72. The method as claimed in claim 65 further comprising directing any of the at least one voice calls to the plurality of gateways with a load balancing switch.

73. The method as claimed in claim 65 wherein the data provided to the call restoration data table is transmitted to the call restoration data table in a session initiation protocol packet, further wherein the session initiation protocol packet includes a header and a Session Description Protocol (SDP) body.

74. The method as claimed in claim 73 wherein the data provided to the call restoration data table is stored as a key value pair, further wherein the key value pair is derived from the header and the SDP body.

\* \* \* \* \*